United States Patent [19]
Grobicki et al.

[11] Patent Number: 5,471,474
[45] Date of Patent: Nov. 28, 1995

[54] COMMUNICATIONS HIGHWAY NETWORK SYSTEM

[75] Inventors: Christopher Grobicki, Andover; Cynthia Mazza, Lynn; Edward O'Connell, N. Andover; John Ulm, Pepperell; Gerard White, Tyngsborough, all of Mass.

[73] Assignee: LANcity Corporation, Andover, Mass.

[21] Appl. No.: 72,585

[22] Filed: Jun. 4, 1993

[51] Int. Cl.$^6$ ............................................. H04J 3/02
[52] U.S. Cl. .................................. 370/85.2; 370/94.1
[58] Field of Search .................... 370/85.2, 85.3, 370/60, 94.1, 85.6, 85.7, 85.1, 108, 85.9, 85.4, 85.5, 105.1, 100.1, 95.1, 95.3; 340/825.5, 825.51, 825.52, 825.05; 455/6.1, 6.2, 6.3, 13.3, 82; 375/354, 365

[56] References Cited

U.S. PATENT DOCUMENTS

| | | | |
|---|---|---|---|
| 4,500,989 | 2/1985 | Dahod | 370/85 |
| 4,757,460 | 7/1988 | Bione | 364/514 |
| 4,774,707 | 9/1988 | Raychaudhari | 370/85.2 |
| 5,115,427 | 5/1992 | Johnson, Jr. et al. | 370/60 |
| 5,237,567 | 8/1993 | Nay et al. | 370/85.2 |
| 5,237,696 | 8/1993 | Best | 370/85.2 |
| 5,251,212 | 10/1993 | Gass | 370/85.2 |

*Primary Examiner*—Douglas W. Olms
*Assistant Examiner*—Dang Ton
*Attorney, Agent, or Firm*—Hale and Dorr

[57] ABSTRACT

A communications highway network system for the interactive communication of digital and analog information that incorporates LAN, MAN, and CATV technology to provide an information pathway of metropolitan size that has a spanning tree topology. The system is multiple drop that operates according a network protocol. The network protocol is based on modified TDM techniques, compensation for round trip loop delay, dynamic allocation of time slots on the network bus, and global synchronization. The protocol also permits concatenation of data packets to reduce overhead. Access to the network bus is controlled by a system allocator operating according to the network protocol. The allocator may allocate network bus bandwidth to simultaneously provide three levels of service for the system nodes to access the network bus, namely, isochronous, demand-based dedicated, and contention bandwidth allocation. This allocation method incorporates fairness to give all nodes sufficient bus access opportunities.

55 Claims, 10 Drawing Sheets

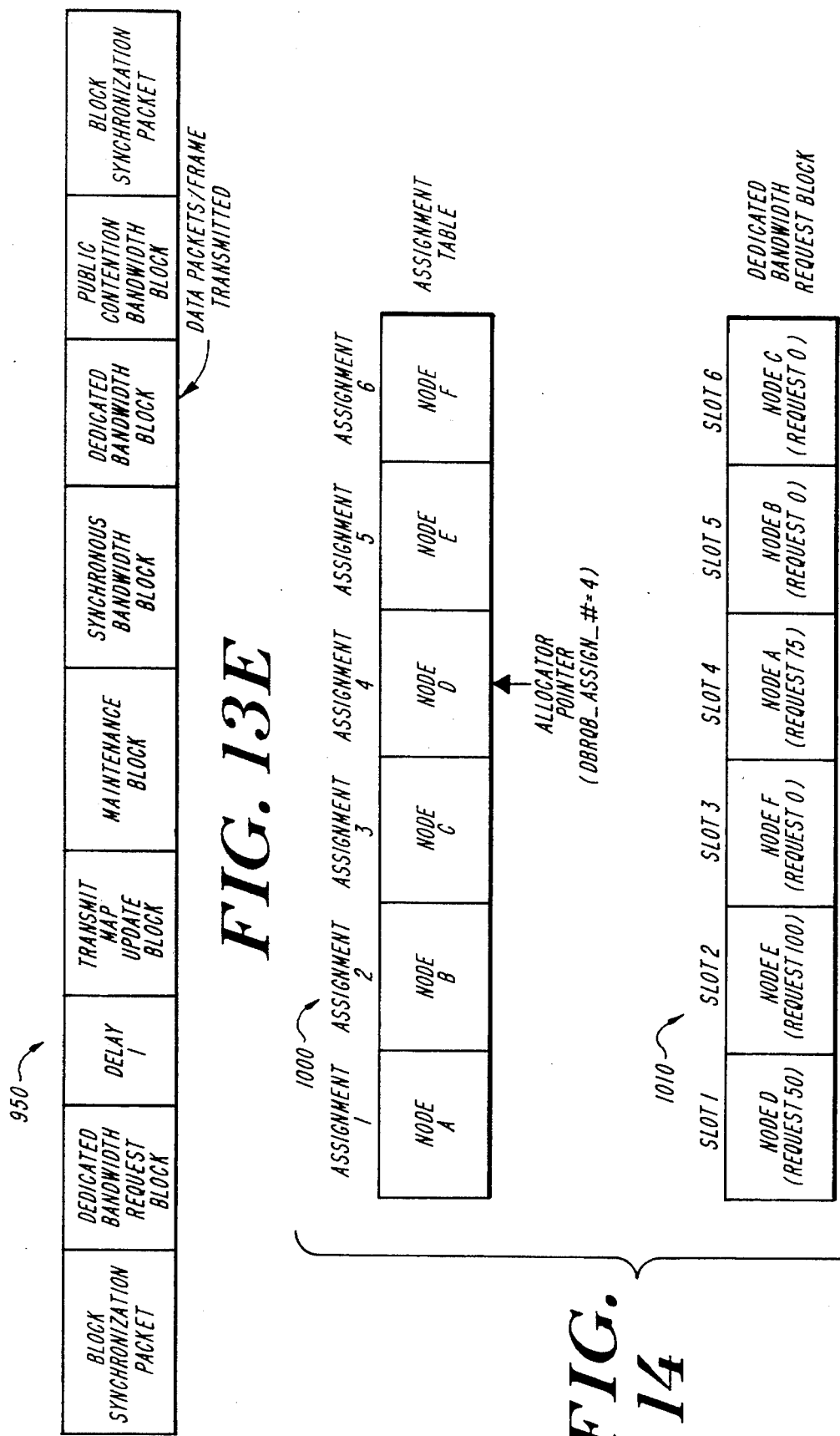

COMMUNICATIONS HIGHWAY NETWORK SYSTEM

FIELD OF THE INVENTION

The present invention relates to systems that are used for the distribution and control of information signals over a multiple drop communications network. More specifically, the present invention relates to systems that are used to distribute and control information signals over a multiple drop communications network that spans an area up to metropolitan distances or greater.

BACKGROUND OF THE INVENTION

In the ever changing world of data communications, there have been advances in the efficiency and complexity of local area networks (LANs). From networks for the simple exchange of data between a few computers, LANs have become reasonably sophisticated multiple drop systems allowing interactive communications between not only computers but a number of other types of devices that are connected to, and operational on, such LANs.

LANs, however, are private, closed systems. This means that the LAN system architecture is optimized around the assumption that only a small, defined number of authorized users will be serviced. Moreover, a single LAN is only meant to service a small geographic area, which is a few miles at most. This is true for both wired and wireless LANs.

The LAN concept has been expanded to cover larger geographic areas and these systems are referred to as metropolitan area networks (MANs). MANs, like LANs, are multiple drop systems but MANs usually have a much larger number of authorized users. MANs also may be wired or wireless.

LANs, both wired and wireless, support the transmission of voice and data signals. The voice signals may be either analog signals or digital signals representative of the analog signals. The data signals also may be analog or digital signals. MANs support voice and data signals like LANs. It would be desirable, however, to have a data communications system as large or larger than a MAN with the attributes of LANs with respect to ease of operations.

LAN and MAN systems usually support random access to the network bus by the authorized user. Depending on the system configuration and operating protocol, these systems attempt to minimize the number of collisions on the network bus by using an arbitration scheme. This device will prioritize use of the network bus among the authorized users. The arbitration function becomes increasingly difficult as the traffic on the network bus increases. Collisions on the bus result in the inefficient use of network bus bandwidth, thereby significantly increasing the latency in transmitting data from a source to its destination. Moreover, as the number of collisions on the bus increase, the ability of authorized users to gain access to the bus decreases.

LAN and MAN systems have used various protocols to prevent collisions on the bus. These include polling, priority requests, carrier-sensing, carrier-sensing with collision-detection, token-passing, and cyclic time-division.

The listed protocols generally solve the collision problem on heavily loaded network buses by allowing only one node at a time to access the bus. As each node relinquished the bus, the protocol would grant another node access to it. Each subscriber requesting bus access would be granted access in due time according to protocol queuing method.

Certain of the listed protocols permitted nonarbitrated access to the bus when the bus was considered lightly loaded. This was because the likelihood of collisions was small. However, the network conditions can change rapidly, so a lightly loaded bus could suddenly become heavily loaded and there would be a large number of collisions on the bus and a substantial loss of bandwidth. Even when it was feasible to use the non-arbitrated access method, there was still only one node at a time given access to the bus.

As systems expanded from LAN type systems to MAN type systems, significant time delays became associated with the system node accessing the network bus. These delays were loop delay times. A loop delay time is the time it takes a transmitted message to be received back by the transmitting node. The maximum loop delay for the system is the loop delay for the node farthest from the head end. Each node had a different loop delay. If any two or more nodes do have the same delay, it was purely by chance.

With the delays, collisions, and other factors that surface as a system approaches the metropolitan area size, it becomes increasingly difficult to find a protocol that serves the needs of high bandwidth and low bandwidth users. In many cases, the needs of these two user groups are in opposition.

For efficient use of the network bus, it is necessary to know the loop delay time for each node and compensate for it in granting a system node access to the network bus. Since loop delay usually is not determined for each system node, to avoid collisions, the arbitration scheme of prior art systems usually waited the maximum loop delay time before granting another node access to the bus.

Community-antenna television (CATV), often referred to simply as cable TV, uses coaxial cable to distribute standard television signals to customers receiving the service. Generally, CATV systems are accessed by greater numbers of users than access either LAN or MAN systems. CATV systems typically include a head end at which signals that are received from the source of programming material are processed for transmission over the system, a trunk system, which is the main artery carrying the processed signals, a distribution system, which is a bridge from the trunk system lines and carries signals to subscriber areas, and subscriber drops, which are fed from taps on the distribution system to feed subscriber TV receivers.

In order to service the large number of subscribers positioned randomly over the very large geographic area covered by a CATV system, the head end has both wireless and wired connections to distribution systems or remote head ends, which connect to yet further distribution systems. These distribution schemes include the use of satellites.

The primary goal of CATV has been to provide high quality TV signals for subscribers. However, today some CATV systems use optical fiber cable to increase the number of channels that can be carried. These systems also have some interactive communications between the subscribers and the programming source, and between subscribers. As a result, CATV systems can carry many more TV channels than ever before, as well as provide other types of communications services on a limited basis.

CATV systems have a spanning tree topology. In principle, this could be adapted to expand the interactive communications capability that now exists in CATV systems. However, CATV systems were not designed for the wideband communications used by LAN and MAN systems. Moreover, CATV systems are not designed or particularly adaptable to accept data communications formatted for communications over LAN and MAN systems.

There is a need for an interactive communications system that covers a large geographic area and has a larger number of system nodes that marries the attributes of CATV, LAN, and MAN technology but has a bus protocol that permits more than one data packet access to the network bus, compensates for the large loop delays associated with each system node, and can adjust to the changing traffic demands on the network bus, yet appear like a LAN to the user.

SUMMARY OF THE INVENTION

The elements of the communications highway network system of the present invention are the distribution system of a CATV infrastructure and a large number of system nodes that connect to the distribution system. Each system node includes a CPU module which is capable of controlling the system of the present invention, an RF modem module for interfacing the system node with the distribution system, and a power supply. The CPU module is a protocol engine for controlling movement of data packets over the communications highway network system of the present invention. The RF modem module is the interface for sending signals to, and receiving signals from, the CATV system. The power supply powers the CPU and RF modem modules. The system also includes a system pacer to provide global synchronization for all system nodes and an allocator for controlling access to the network bus. Due to the system of the present invention employing a distributed protocol, each system node is capable of performing the pacer and allocator functions.

The system of the present invention uses a spanning tree topology of a CATV infrastructure to reach metropolitan distances and greater. The system of the present invention also has significantly greater throughput than prior art systems because of its MAC layer protocol. However, to the user of the system of the present invention, it appears like a LAN.

The communications highway network system uses channels of the CATV system for its transmission to the system nodes. These channels are considered the network bus of the system of the present invention. The network bus includes both wired and wireless portions. All information transmitted on the network bus, whether voice, video, or data information, is a serial-digital stream that has been converted to RF signals compatible for use on the network bus. However, if a different type of network bus is being used, when necessary, the transmitted information will be converted from the serial-digital stream to signals compatible for use on that network bus.

The protocol used by the system of the present invention is based on modified time division multiplexing (TDM) techniques, compensation for system node round trip loop delay, dynamic allocation of slot times on the network bus, and global synchronization. The protocol also considers concatenation of data packets on the network bus under certain circumstances to reduce transmission overhead. The use of this protocol results in an efficient use of the network bandwidth and a high throughput of data for each of the nodes that access the network bus.

This high throughput is accomplished by serving the system nodes with at least three levels of service. These may be fixed (isochronous) access, demand-based (dedicated) access, and random (contention) access to the network bus, which is divided into slot times according to modified TDM techniques. The protocol of the system of the present invention permits more than one data packet to be on the network bus at a time, which contributes significantly to the increased throughput. These multiple data packets on the network bus may be from one system node or a plurality of system nodes.

The network protocol relies on each of the nodes being synchronized since the network bus is partitioned into time slots according to TDM techniques. This global synchronization is achieved by use of a single system pacer.

A system allocator implements the protocol to allocate network bandwidth to the system nodes requesting it. The allocator can simultaneously provide the three levels of service in granting system nodes access to the network bus. When any of these levels of service are used, data packets may be concatenated to reduce the overhead necessary for sending the data packets. Moreover, the system protocol allows the allocator to dynamically adjust slot assignments between contention and demand-based dedicated time slots depending on network conditions, i.e., whether the network bus is lightly or heavily loaded. The slot allocation method of the present invention also supports variable size packets that span more than one time slot on the network bus. Accordingly, it is not necessary to fragment packets for transmission nor is it necessary to have sophisticated algorithms to reassemble the fragmented packets. The protocol also permits fairness in allocating network bandwidth and aging out certain uses of the bandwidth which prove to be inefficient.

The present invention will be described in more detail subsequently referring to the drawings.

BRIEF DESCRIPTION OF THE DRAWINGS

FIGS. 13A, 13B, 13C, 13D, and 13E show a method for dynamic allocation of time slots.

FIG. 14 shows the relationship between the assignment and slot tables of the dedicated bandwidth request block.

DETAILED DESCRIPTION OF THE DRAWINGS

The present invention is a high performance, high volume communications highway network system that permits the interactive communications of data packets among a plurality of system nodes in a multiple drop environment. The communications highway network system of the present invention may be implemented in an existing CATV system infrastructure or it may be an independent system using a spanning tree topology of a CATV system. All information transmitted over the network bus, whether voice, video, or data information, is a serial-digital stream converted to RF signals that are compatible for use on the network bus. It is understood that if a different type of network bus is being used, the transmitted information will be converted, if necessary, from the serial-digital stream to signals compatible for use on that network bus. Before discussing the communications highway network system of the present invention in detail, the following glossary of certain acronyms, mnemonics, and terms that are used in this specification is provided in Table I:

TABLE I

| Acronym/Mnemonic/Term | Description |
|---|---|
| BS | Block synchronization. |
| CATV | Community-antenna television. |
| CPU | Central processing unit. |
| CRC | Cyclic redundancy check field. |
| DA | Destination address field. |
| DBB | Dedicated bandwidth block. |
| DBRQB | Dedicated bandwidth request block. |
| DBRQB_ASSIGN_#_HEAD | Dedicated bandwidth request block assignment number header. |
| DBRQB_ASSIGN_# | Dedicated bandwidth request block assignment number. |
| DED | Dedicated field. |
| EHDR | Extended header field. |
| ELEN | Extended header length field. |
| ENET | Ethernet. |
| FC | Frame control field. |
| FLEN | Frame length field. |
| FRAME | A single transmission, IPG to IPG. It may or may not span multiple time slots and it may contain multiple packets. |
| IPG | Interpacket gap field. |
| HCS | Header check sequence field. |
| LAN | Local area network. |
| LEN | Length. |
| MAC | Media access control layer. |
| MAN | Metropolitan area network. |
| MDI | Modem digital interface. |
| NMS | Network management system. |
| PACKET | A group of bits including address, data, and control elements that are switched and transmitted together. |

TABLE I-continued

| Acronym/Mnemonic/Term | Description |
|---|---|
| PARAM | Parameter field. |
| PC | Personal Computer. |
| PCx | Frame control field for an individual data packet in a concatenated data packet. |
| PCRC | Cyclic redundancy check field for an individual data packet. |
| PCSx | Checksum field for an individual data packet in a concatenated data packet. |
| PLENx | Frame length field for an individual data packet in a concatenated data packet. |
| PRE | Preamble field. |
| QPSK | Quadrature phase shift keying. |
| RF | Radio frequency. |
| SA | Source address field. |
| SEED | Scrambler seed field. |
| SFD | Start frame delimiter field. |
| TDM | Time division multiplexing. |

General System Description

Figure 1:
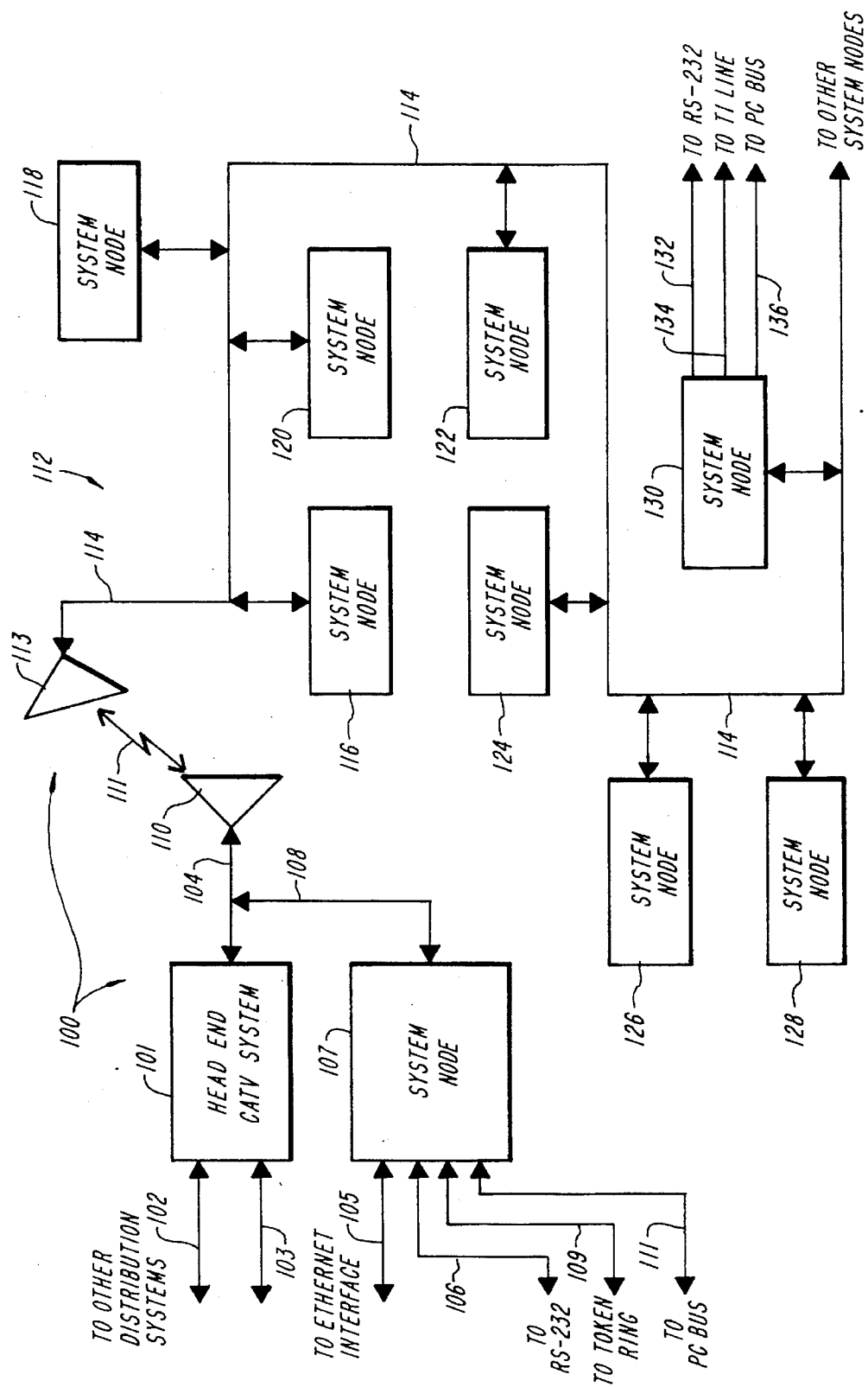
FIG. 1 shows an exemplary communications network incorporating the communications highway network system of the present invention.

Generally at 100, FIG. 1 shows an exemplary communications system that incorporates the communications highway network system of the present invention. According to FIG. 1, the system of the present invention is incorporated in the spanning tree infrastructure of a CATV system. The CATV system includes head end 101, which is the programming source for the CATV system and serves as the central distribution facility. The signal output from head end 101 on line 104 is a wideband signal which normally can support as many as 83 cable channels with each channel having a bandwidth of 6 MHz. However, the use of optical fiber cable can dramatically increase the number of channels that the head end will support, which is being speculated to be as many as 500. Line 104 connects to transceiver 110, which broadcasts the cable signal over air interface 111 to distribution system 112.

Distribution system 112 is representative of one of the many distribution systems that may connect to head end 101. These distribution systems may be indirectly connected to the head end, like distribution system 112, or directly connected to the head end, like the systems at 102 and 103. The systems at 102 and 103 may be optical fiber distribution systems or standard coaxial cable distribution systems.

Distribution system 112 includes transceiver 113 which connects to line 114. Line 114 serves as the distribution system bus. The distribution system bus has system nodes 107, 116, 118, 120, 122, 124, 126, 128, 130, and other system nodes not shown connected to it. If the CATV system is an interactive type system, lines 102, 103, 104, and 114 will actually be two lines to permit full duplex system operations. It is also within the scope of the present invention for a single line with a frequency translator to be used.

Representation system node 107 will now be discussed. System node 107 of the system of the present invention via line 105 may connect to an ethernet interface, via line 106 to an RS-232 interface, via line 109 to an interface to a token ring, and via line 111 to an interface for a PC bus. Similarly, system node 130 via line 132 may connect to a RS-232 interface, via line 134 to T1 trunk interface, and via line 136 to PC bus interface. The buses of the systems that connect to the system nodes form part of the network bus of the communications highway network system of the present invention.

Line 108 is the drop line that connects system node 107 to line 104 of the CATV system. As an example, it is contemplated that the signals from system node 107 will use at least one 6 MHz forward channel and at least a 6 MHz reverse channel of the CATV system. This will permit the ethernet subscribers, and the token ring and PC bus users to interactively communicate with system nodes of various branches and twigs of the network system of the present invention. Accordingly, line 108, the channels of the CATV system that are dedicated to the communications highway network system of the present invention, and the bus or buses of systems connected to the system nodes form the network bus of the system of the present invention. The present invention provides a protocol for accessing the system bus for interactive communications that is efficient and minimizes collisions as will be described in detail subsequently.

Figure 2:
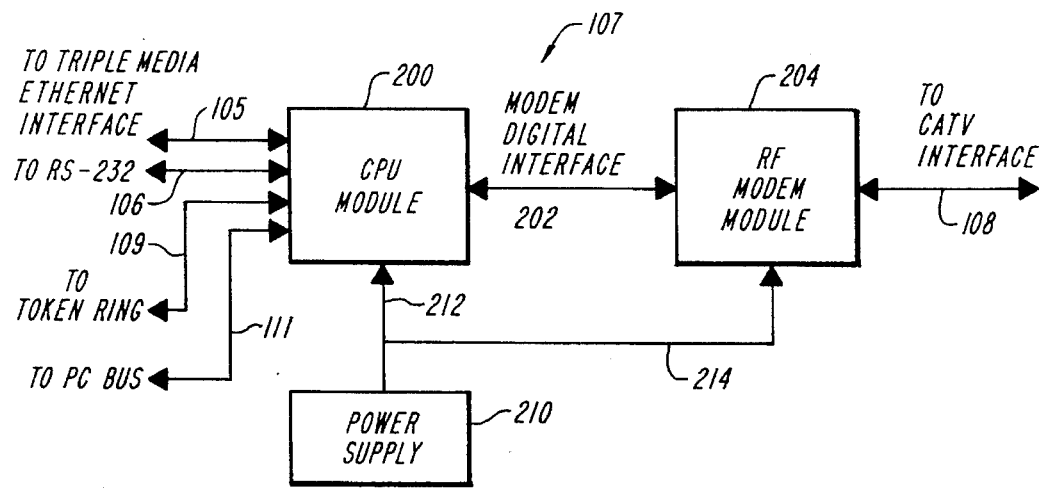
FIG. 2 shows the elements of a system node of the communications highway network system of the present invention.

Referring to FIG. 2, the modules that make up each system node are shown. For purposes of example only, the system node shown in FIG. 2 will be described referring to system node 107. System node 107 includes CPU module 200, RF modem module 204, and power supply 210. CPU module 200 via line 105 is connected to a triple media ethernet interface, via line 106 is connected to a RS-232 interface, via line 109 is connected to a token ring interface, and via line 111 is connected to a PC bus interface. It is understood that the CPU module may connect to other peripherals and buses and still be within the scope of the present invention. Preferably, CPU module 200 includes a CPU with related memory, bus, and core elements, a MDI for connection to RF modem module 204, a RS-232 interface, a display, and a nonvolatile memory. Moreover, various conductivity systems may be connected to the CPU module, such as an ethernet controller, a PC bus interface, T1 and T3 trunk interfaces, and a token ring interface.

CPU module 200 is a protocol engine for controlling the movement of packet data over the communications highway network system of the present invention. Taking for example an ethernet system that connects to the CPU module via line 105, the CPU module is the primary data link between the ethernet subscribers and the system nodes of the various distribution systems. The CPU module is capable of processing triple media ethernet data, such as 10Base5, the thicknet version, 10Base2, the thinnet version, and 10Base T, the twisted-pair version. Since the system of the present invention may include the ethernet and its subscribers, reference to the system nodes is meant to include the ethernet subscribers or other system users that may form part of the system of the present invention in the same manner as the ethernet subscribers.

The MDI portion of the CPU module provides an interface to the RF modem module. As such, it provides for the transfer of data, control, and status information, as well as power, to RF modem module 204. The CPU module's connection to the RS-232 via line 106 may provide a means for remote, out of band communications for various purposes, some of which may be diagnostic, NMS development, and overall system control. Similarly, the CPU module's connection to other systems expands the communications highway network system of the present invention.

RF modem module 204 will interface with the CATV system via line 108 and provide the modulation and demodulation function for converting between the broadband signals on the CATV system and the baseband signals from the CPU module. Preferably, RF modem module 204 will use QPSK modulation and demodulation techniques so that it will be compatible with the channel allocation technology of the CATV system. On the transmission side, RF modem module 204 will transmit 10 Mbps of data information on the 6 MHz bandwidth forward channel. Similarly, on the receive side, the RF modem module can capture 10 Mbps of data information from the 6 MHz bandwidth reverse channel of the CATV system. However, it is still within the scope of the present invention to use other channel bandwidths as long as they are compatible and for the throughput of the data to vary depending on system design and demands.

Power supply 210 connects to CPU module 200 via line 212 and connects to RF modem module 204 via lines 212 and 214. The power supply provides +5 VDC, +12 VDC, and −12 VDC appropriately to the CPU and RF modem modules.

Communications Highway Network System Protocol

The protocol of the communications highway network system of the present invention provides the system nodes access to the network bus based on modified TDM techniques, compensation for round trip loop delay, dynamic allocation of slot times on the network bus, and global synchronization. This protocol also permits concatenation of data packets on the bus under certain circumstances.

Following the network protocol, the network allocator, which will be discussed in detail subsequently, assigns transmit opportunities to the system nodes. These transmit opportunities are time slots of the network bus relative to a synchronization signal. These may be isochronous, demand-based dedicated, or contention opportunities.

Only the system node assigned isochronous or demand-based dedicated transmit opportunities may transmit during such periods. However, one or more nodes may transmit during contention transmit opportunities. It is only in this later period that collision can take place.

Since the round trip for the system node transmissions may be up to metropolitan distances or greater, these transmissions experience large network delays. As such, it is necessary for a node to start its transmission a loop delay earlier than its assigned slot times. This round trip loop delay is the time it takes for a node to send a signal and receive back the echo. According to the protocol of the system of the present invention, each node must know its loop delay before it can access the network bus to transmit data. A system node, however, can always access the system bus to calculate its loop delay.

A system allocator following the network protocol can dynamically change the allocation of slot time assignments for the system nodes between demand-based dedicated slot times and contention slot times. According to the protocol, when the network bus is lightly loaded, the allocator generally assigns all nodes contention slot times. At this level of bus loading, the nodes usually get immediate access to the network bus and there are very few collisions. As bus loading increases and there is congestion on the network bus, the allocator assigns demand-based dedicated slot times to some of the nodes to keep the number of collisions down. When the bus is heavily loaded, the allocator assigns most of the nodes isochronous or demand-based dedicated slot times. This drastically reduces or substantially eliminates the likelihood of collisions on the network bus. To ensure that all of the system nodes gain access to the bus under these conditions, the allocator assigns the demand-based dedicated time slots with fairness.

The network pacer provides the timing events for the system nodes to access the network bus that is partitioned into time slots. These timing events provide global synchronization. The timing events that the pacer is responsible for generating are the BLOCK SYNC packets that all of the nodes use to determine when to transmit in assigned time slots of the network bus. The pacer generates the BLOCK SYNC packets at periodic intervals that are designated Block Synchronization Intervals. It is necessary for system nodes to receive the BLOCK SYNC packets according to the BLOCK SYNC Intervals to be able to transmit on the network bus. If any node loses synchronization, it is not permitted to transmit on the network bus until it again acquires synchronization.

Figure 3:
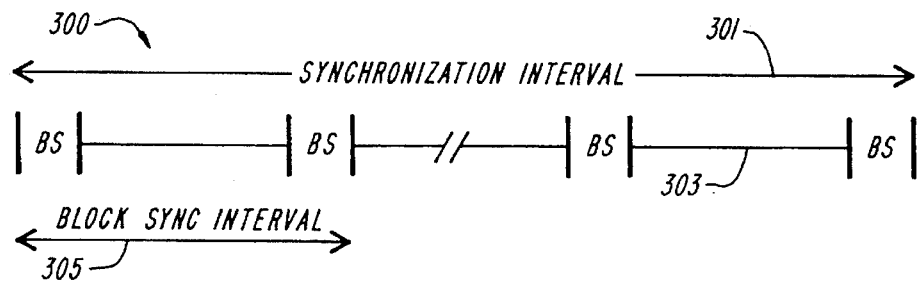
FIG. 3 shows the relationship between the synchronization interval and the block synchronization interval.

A predetermined number of BLOCK SYNC packets and Intervals form a Synchronization Interval. The Synchronization Interval determines the maximum amount of time a system node may go without receiving another BLOCK SYNC packet before it is considered to have lost synchronization. The relationship between the BLOCK SYNC packets and Interval, and the Synchronization Interval is shown in FIG. 3, generally at 300. In that Figure, the Synchronization Interval is shown at 301, the BLOCK SYNC packets ("BS") at 303, and the BLOCK SYNC Interval at 305. The Synchronization Interval and BLOCK SYNC Interval are programmable parameters.

The network robustness level is determined by the number of BLOCK SYNC packets that must be lost before synchronization is lost. Therefore, the robustness level increases as the number of BLOCK SYNC packet increases in the Synchronization Interval. However, higher levels of robustness come at a price, namely, there will be increased overhead because of the increased number of BLOCK SYNC packets.

The pacer is one of the system nodes. The determination of which of the system nodes becomes the pacer takes place after initialization of the nodes on the network. Thus, after each node is initialized, it listens on the network bus for an entire Synchronization Interval to determine if a pacer has been established. If a pacer exists, it will synchronize with the pacer's BLOCK SYNC packets. If the node does not synchronize with a pacer within the Synchronization Interval, it assumes that a pacer does not exist and it will attempt to become the pacer.

The node that successfully transmits its BLOCK SYNC packet and receives the echo back before receiving the BLOCK SYNC packet of another node, meaning that its BLOCK SYNC packet has made a round trip of the network, will become the pacer. All of the other nodes will synchronize to the new pacer. If a node's own BLOCK SYNC packet does not return in a loop delay, it will wait one BLOCK SYNC Interval plus a random backoff time and again attempt to become the pacer. The backoff time is increased with each successive attempt. If, however, the node receives the BLOCK SYNC packet of another before its own returns, it will synchronize to the one that it received and ignore any other BLOCK SYNC packets, even its own. Anytime a node loses synchronization, it will follow the above procedure to again become synchronized or become the pacer. To save time in performing the pacer selection process, only a predetermined number of system nodes will be predisposed to become the pacer.

As stated previously, the network protocol is based on modified TDM techniques, compensation for round trip loop delay, dynamic allocation of slot times on the network bus, and global synchronization through pacing. Pacing has been discussed above. The other factors that determine the network protocol will now be discussed in the context of accessing the network bus.

Because of the size of the communications highway network system of the present invention, the system nodes experience large delays in accessing the network bus. To be able to efficiently transmit data packets over bus, the protocol calls for the nodes to start their respective transmissions a loop delay earlier than the time they are assigned a transmit opportunity in one of the three levels of service. This loop delay is different for each node so each node must know its own loop delay. Without knowledge of its loop delay, a node can not properly transmit its data packets in the assigned time slots of the network bandwidth because it will not be able to properly time when to access the bus.

Each node calculates its loop delay by transmitting a Determine Loop Delay packet to itself. The node times how long it takes to receive the packet back. If this packet does not come back, the node assumes that there was a collision, backs off a predetermined period of time and tries again by sending a second Determine Loop Delay packet. This procedure is repeated until the node determines its loop delay or times out.

Referring to FIG. 3, each BLOCK SYNC Interval following the BLOCK SYNC packet is divided into equal-sized, time slots that are potential transmit opportunities. The slot size is a programmable parameter. Each slot has state information associated with it. This state information is stored in a table at each node. The size of the table equals the BLOCK SYNC Interval divided by the slot time. This state information is set forth in Table II.

TABLE II

| State Information | Meaning |
| --- | --- |
| Slot Type | Dedicated or Contention. |
| Transmit Control | S = Enabled to start or continue transmission. C = Enabled to continue but not start a transmission. X = Transmits forbidden for this slot. |
| Transmit Size | Places restrictions on the size of packets that may start during the time slot. |
| Global Dedicated and Contention Control | Allows global enables and disables. |
| Transmit Priority | Allows a node or subscriber to prioritize internal transmit queues. |
| P-Persistence Value | Probability a system node will transmit in a particular public contention block. |
| BLOCK SYNC Boundary Indicator | Provides synchronization between the table and transmitter timers. |
| Backoff Indicator | Determines which slots are counted for determining the backoff amount. |

When a node is given access to the network bus, it may transmit its packet in one or more time slots but it can only start the transmission in a time slot with its transmit control set to "S."

Although there are three types of transmit opportunities that the allocator may assign to a system node, for the purposes of discussing the protocol here, the isochronous and demand-based dedicated transmit opportunities will be considered generally together as dedicated transmit opportunities. Therefore, the two will hereafter be referred to as dedicated transmit opportunities unless it is necessary to differentiate between them.

If only one system node is granted access to a particular time slot to transmit its data packets, this is a dedicated assignment. Dedicated assignments have the advantage that the packets in such slots will not be subject to collisions on the network bus. Because there is no possibility of collisions for data packets that have been assigned dedicated time slots, a node considers the transmission of a packet complete once it has been sent and does not wait for an echo. As such, once a node has transmitted a first packet, it can transmit the next available packet as long as it has available dedicated bandwidth. This permits the node to transmit multiple packets on the network bus, thereby significantly increasing the node's throughput. Moreover, because there are no possibilities of collisions, retries are not necessary. The only drawback is that if the node does not transmit in the slot, the bandwidth is wasted.

If multiple nodes are allowed to transmit during a given time slot, this is a contention transmit opportunity. During these time slots, the packets of multiple nodes are subject to collisions. As stated, the network protocol uses this type of access control usually when the network bus is lightly loaded because under such circumstances the access time is greatly reduced than if dedicated assignments were used. However, as the traffic on the network bus increases, this method of access becomes increasingly undesirable because of the number of collisions that occur and the time required to correct for such collisions seriously decreases throughput and wastes bandwidth.

To improve network performance in situations in which the network bus is moderately loaded, the allocator, according to the network protocol, assigns the system nodes both dedicated and contention time slots. Because of greater traffic on the network bus, those nodes that have been assigned contention slots may defer transmission of any pending packets if certain conditions exist.

A first basis for deferring transmission is that the node must wait for a start time slot or must wait for a start time slot that is large enough based on the transmit sizefield. This not only applies to contention opportunities but also dedicated ones.

A second basis, which applies only to contention opportunities, is that the node may be deferring transmission due to a previous collision and backoff. A third reason for deferring transmission is that since the protocol only allows one contention data packet from a node to be on the network bus at any one time, if a collision is detected in the collision window, which is one loop delay period, the node will retransmit the data packet involved in the collision without worrying about the other packets in the transmit queue.

P-persistence is a fourth basis for deferring transmission. P-persistence is the probability, P, that a node will transmit in a valid contention transmit opportunity. As the network becomes more heavily loaded, the probability that a node will transmit during an available contention transmit opportunity is reduced which reduces the collisions and increases the throughput for the node even though latency increases.

The fifth deferral reason is that if a node senses transmissions of the network bus, it will defer its transmissions to avoid collisions. To accomplish this, the node reads the length field at the beginning of any data packets which the node receives over the network bus, and as long as the remaining number of bytes in the passing packet is greater than the loop delay of reading node, it will defer its transmissions. However, a deferring node must transmit if it is assigned a dedicated time slot to prevent bandwidth waste.

In order to increase the throughput in each of the three types of transmit opportunities, the network protocol provides for the concatenation of multiple data packets. Concatenated transmissions reduce the probability of collisions since the concatenated frame experiences only one collision window while ordinarily each packet of the concatenated frame would experience a collision window of its own. Concatenation also reduces the overhead for the transmission. The concatenated frame can be variable in length up to predetermined length size. When the concatenated frame is received at its destination, it is demultiplex into the original, individual data packets.

When concatenated data packets are transmitted in the contention mode, if the first packet is successfully transmitted, the protocol assumes that no collision has occurred and the remainder of the packets are treated as if they are dedicated transmissions. If, however, the first packet experiences a collision, the concatenated packets together back off and retransmission is attempted at a later time.

As stated, when the contention access method is being used, a node assumes that a transmission is successful if the echo of the transmitted packet is received by that node at the appropriate time, which is a loop delay after the transmission. If the node fails to receive the echo, it assumes that the transmission has failed because a collision or some type of error event has occurred. If a collision is detected in the collision window, a predetermined retry count is incremented, the transmission waits a backoff period, and the packet is retransmitted subject to the deferral rules. If the retry count exceeds a predetermined maximum value, it is considered an error condition and the transmission of this packet is aborted. If the error is one that is detected outside the collision window, a bit error is assumed and the packet transmission is not retried and is aborted. The protocol will reset or decrement the backoff period after successful transmission by the node.

FIGS. 4, 5, 6, 7, and 8 show representative formats for transmissions on the bus according to the network bus protocol.

Figure 4:
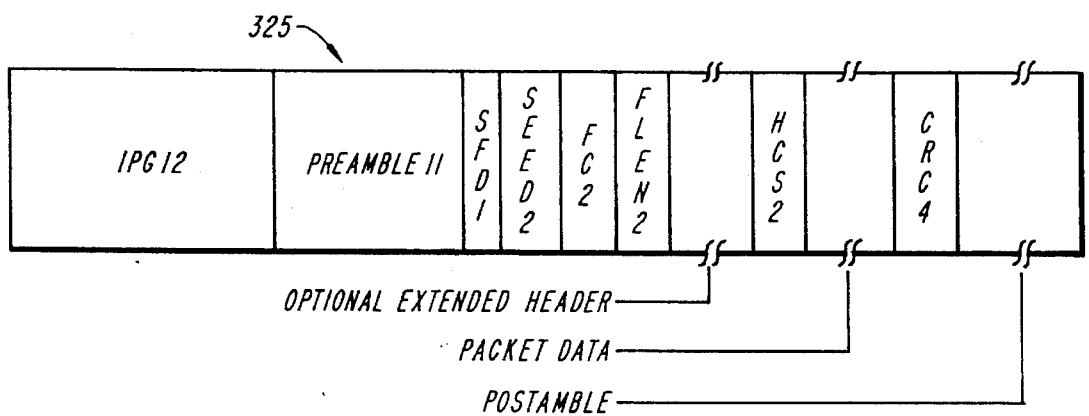
FIG. 4 is an example of a frame format used by the communications highway network system of the present invention.

Referring to FIG. 4, a representative frame format for the transmission of data packets on the network bus is shown at 325. A frame is a single transmission that may span multiple time slots and may include multiple packets. The first field in FIG. 4, is the 12 byte IPG field. This field is to allow for the physical layer, the RF modem module, turn off times and to provide delineation between data packets and frames. The second field is the 11 byte PRE field. This field is a repeating hex pattern 11. The Preamble is used by the physical layer, the RF modem module, to synchronize to the incoming data packet or frame, but will be transparent to the higher layers, such as the MAC layer. The next field is the SFD field. This field is 1 byte long and is the hex pattern D1. The SFD field delineates the start of the actual data frame. The SFD field is used with the SEED field as will be described.

The fourth field is the 2 byte SEED field. A 24 bit scrambler, which is used for the transmission of data on the network bus, uses the 16 bit SEED field and the 8 bit SFD field as the starting pattern. All fields following the SEED field are scrambled. The SEED field is incremented after each transmission. The node that receives the data packet descrambles all data after the SEED field.

The next field is the 2 byte FC field. The frame format can be one of two types: transparent mode and non-transparent mode. The non-transparent mode is intended for MAC layer generated frame control of the communications highway network system, while the transparent mode is intended for frames containing packets generated by higher level services, such as applications requiring data communications.

Figure 5:
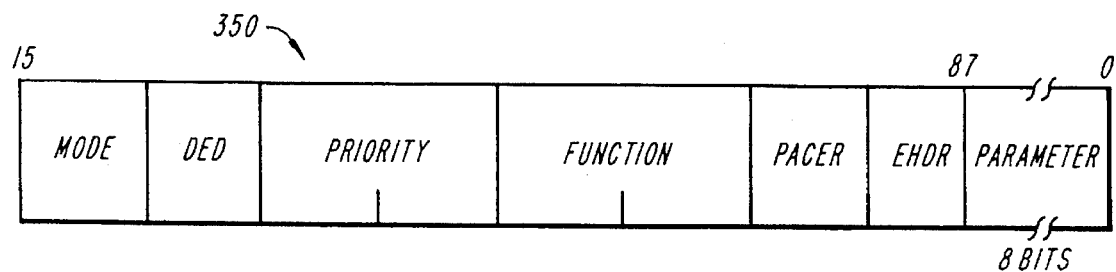
FIG. 5 is an example of a frame control word format used by the communications highway network system of the present invention.
Figure 6:
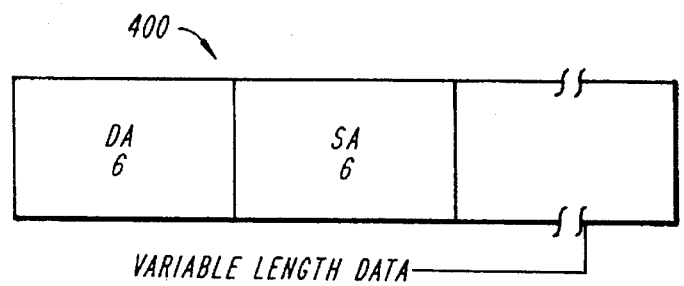
FIG. 6 is an example of a variable length data field used by the communications highway network system of the present invention.

Referring to FIG. 5, generally at 350, a representative frame control word format for the 2 byte FC field is shown. The 1 bit MODE field determines the format: 0= Transparent and 1= Non-transparent. The 1 bit DED field is for indicating the type of packet being transmitted in the frame: 0= Contention packet and 1= Dedicated packet. This field is used by the allocator and provides network management statistics. The 2 bit PRIORITY field is used to show the transparent mode priority of the data packet being sent in the frame. The priorities are the following:

00= Normal Priority Field.
01= High Priority—Allocation Packet.
10= High Priority—Reserved.
11= High Priority—Reserved.

The 2 bit FUNCTION field is used to describe the function of the non-transparent packet being transmitted according to the following:

00= BLOCK SYNC packet.
01= Loop Delay packet.
10= Auto-Concatenate Header.
11= Reserved.

The FUNCTION field is interpreted only if the non-transparent mode is enabled and there is no extended header.

The next field of the frame control word format is the 1 bit PACER field. If the node is the pacer, this bit is set to 1 and if it is not, it is set to 0. This bit is set on every packet transmitted by the pacer. Other nodes leave this bit cleared. The 1 bit EHDR field is intended for use when the transparent mode is enabled. This bit is not interpreted if the non-transparent mode is enabled. If this bit is set at 0, there is no extended header and if it is set at 1, there is one.

The 8 bit PARAM field is the next field. The PARAM field has multiple functions. If the transparent mode is enabled and the EHDR field=1, then the PARAM=the length of the extended header, which may be 0–255 bytes. Further, if the non-transparent mode is enabled, EHDR= 0, and FUNCTION=1x, then PARAM= the number of packets of the concatenate. Except for these two situations, the PARAM field is reserved and not interpreted.

Again referring to FIG. 4, the next field of the frame format is the 2 byte FLEN field. This field describes the length of the remainder of the frame following this field, excluding the 2 byte HCS field. The optional extended header field that follows the FLEN field allows MAC layer implementations to support a variable length header without having to interpret the header. This is accomplished by encoding the length in the PARAM field.

The 2 byte HCS field is a cumulative check of the frame control length and the extended header, if present. This is used for early collision detection and additional robustness. This value is calculated as a byte wide sum expressed as a 16 bit result.

The packet data is the next field of the frame format. The contents of this field are shown in detail in FIG. 6, generally at 400. The first field of the variable length data is a 6 byte DA section. This section is the destination address field for the packet being transmitted. The next field is a 6 byte SA section. This is the source address of the packet being sent. The final field is the variable length data section. The section contains the data being sent and may be 0–8175 bytes long.

Referring to FIG. 4, the next field of the frame format is the 4 byte CRC field. This field is meant to check the bytes following the HCS field, namely, the DA, SA, and variable length data fields. The final field of the frame format is the POSTAMBLE field. This is inserted as padding after the CRC field to cause the frame to end at a time slot boundary.

Figure 7:
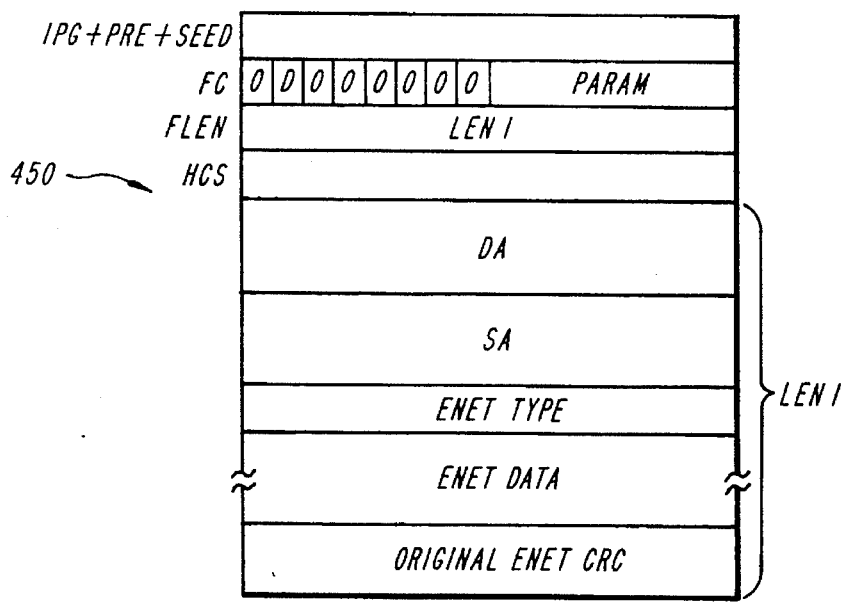
FIG. 7 is an example of a packet format for an ethernet packet with original CRC in the transparent mode that may be transmitted over the communications highway network system of the present invention.
Figure 8:
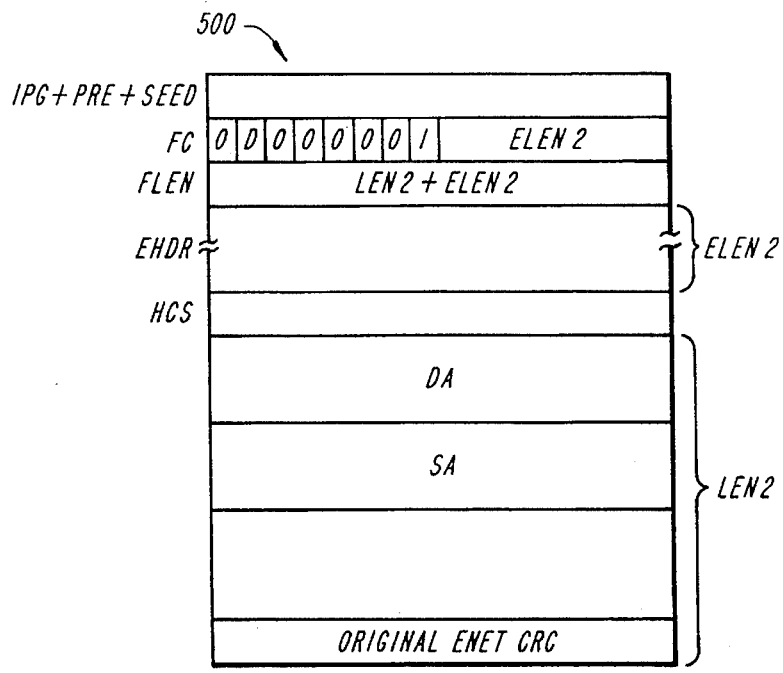
FIG. 8 is an example of a packet format for an ethernet packet with original CRC in the transparent mode and a generated extended header that may be transmitted over the communications highway network system of the present invention.
Figure 9:
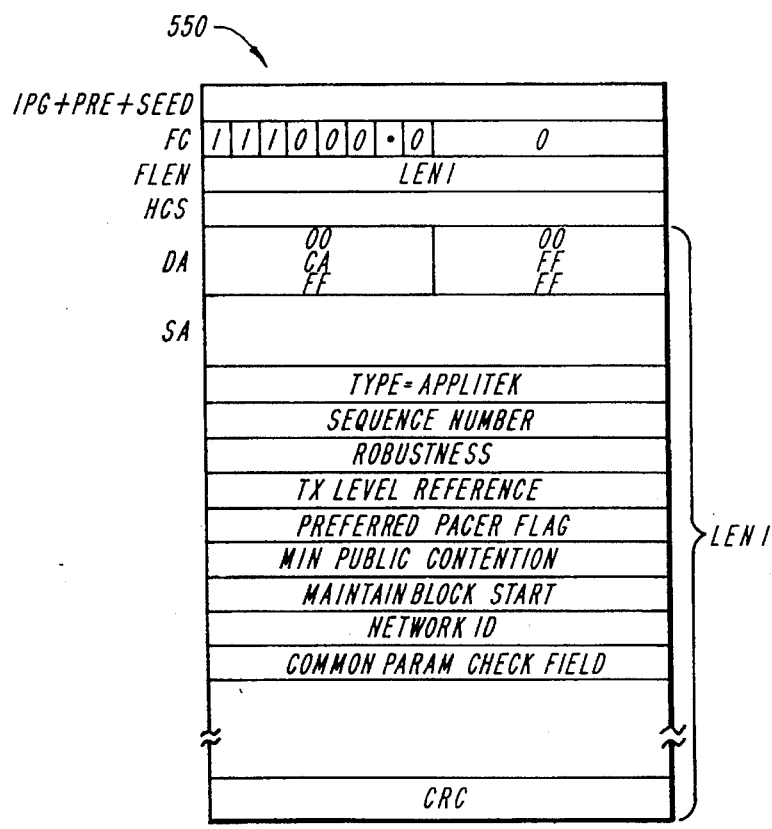
FIG. 9 is an example of a packet format of a BLOCK SYNC packet in the non-transparent mode that may be transmitted over the communications highway network system of the present invention.

Examples of generated packet formats are set forth at FIGS. 7–10. An ethernet packet with its original CRC in the transparent mode is shown at 450 in FIG. 7. An ethernet packet with its original CRC in the transparent mode and with a generated extended header is shown at 500 in FIG. 8. FIG. 9 at 550 shows a packet format for a generated BLOCK SYNC packet in the non-transparent mode.

Figure 10:
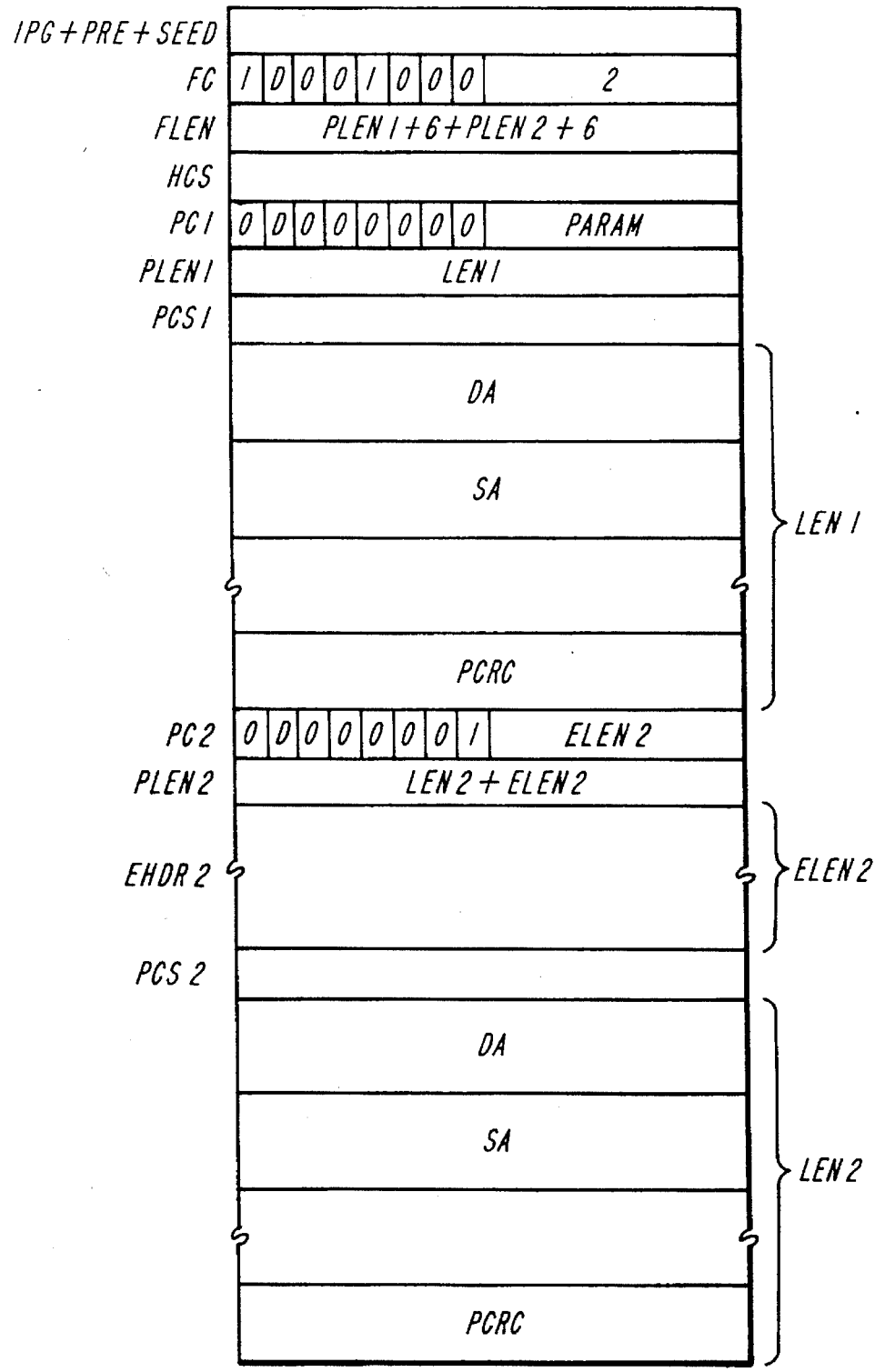
FIG. 10 is an example of a packet format of two concatenated packets in the non-transparent mode that may be transmitted over the communications highway network system of the present invention.

FIG. 10 at 600 shows a concatenate packet that consists of the packet in FIG. 7 concatenated with the packet in FIG. 8 into a single frame. As is shown in FIG. 10, there is only one IPG, PREAMBLE, SFD, and SEED for the frame. These are followed by the FC field with the FUNCTION bits indicating concatenation. The PARAM portion of the FC field is set to 2 to indicate the number of concatenated packets. The FLEN field is the length of the entire concatenated frame. Specifically, the FLEN field equals the sum of all the individual packet lengths plus the 6 bytes of overhead for each packet. This concatenation header is then followed by each of the individual packets, from the control field to the CRC, as each would appear in a single transparent frame.

The final protocol consideration is the collision detection process. A node assumes a contention transmission is successful if the transmitted packet returns at the appropriate time, which is a loop delay after transmission, and both the HCS and the CRC snapshot are verified correct. If the node fails to detect the return packet at the appropriate time or discards the packet prior to the CRC's programmable offset, it is assumed that the transmission has failed due to a collision or an error event. The packet is then queued for retransmission subject to retry counters which provide a backoff period. If the packet has been discarded after the programmable CRC offset, then the packet is treated like a dedicated packet. Under these circumstances, the transmission is considered completed but the packet was lost due to bit error on the network, not a collision.

Once the contention packet is queued for retransmission, the node must wait the backoff period before retrying. If, however, a dedicated time slot assignment becomes available, the retry is sent unconditionally in that slot.

The transmitting system node takes a CRC snapshot at the beginning of a data packet. The protocol relies on the fact that the allocator has assigned slots such that all collisions must occur at this beginning of the data packet. That is, the protocol attempts to determine as early as possible when a collision event occurs through the use of a CRC snapshot. Some of the methods the protocol uses to do this include detecting no carrier or loss of carrier during reception, an insufficient PREAMBLE, an invalid SFD, or an incorrect HCS. In addition to these, the node may provide additional checks for early collision detection.

Allocator

The allocator is layered on the system of the present invention and its functions are preferably performed by the system node that also is the pacer. The allocator allocates the network bus bandwidth in a dynamic manner based on the protocol.

The bandwidth that is allocated is that which exists between two BLOCK SYNC packets. The allocator may assign any of the three levels of service to a system node, which are preassigned dedicated, isochronous, slots; dynamically assigned, demand-based dedicated slots; and public contention slots. Each node is given a service level during system configuration and this level of service is stored in the nonvolatile memory. These levels, however, may be changed during system operation.

Figure 11:
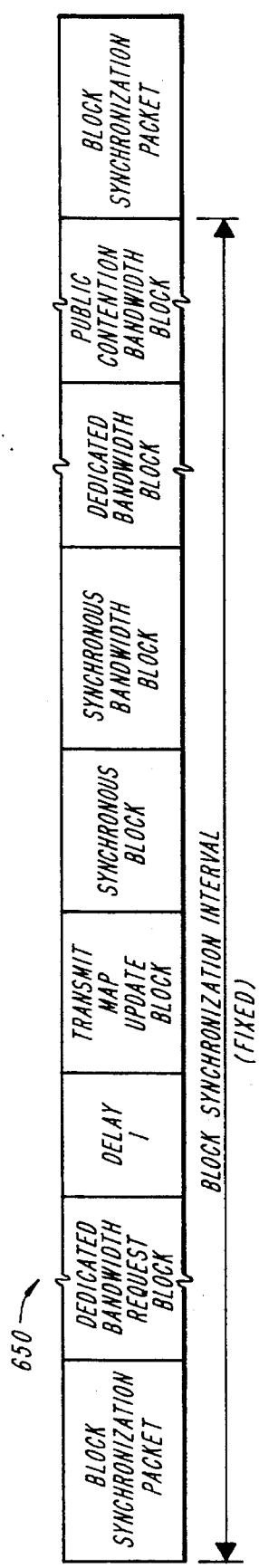
FIG. 11 is an example of the partitioning of a transmit opportunity table.

Each node on the network bus has available a transmit opportunity table that controls that node's access to, and transmissions on, the network bus. FIG. 11 at 650 shows a representative partitioning of a transmit opportunity table. It is the node's use of the transmit opportunity table, which is a product of the allocator, that permits the node to transmit on the network bus. Each of the fields of the table will be discussed subsequently.

The allocator has a number of primary functions. A first is that in providing the highest level of service possible under varying network conditions, it provides the network operating parameters for the public contention block. Specifically, it will provide the "P" value for the P-persistence function. This value will be a function of the network traffic patterns. It will also provide the network hysteresis for retransmission backoff after a collision. Moreover, the allocator provides the preprogrammed amount of public contention bandwidth.

A second primary function is that it provides access to the synchronous dedicated bandwidth block, the isochronous block. This block is manually assignable to a system node through a request/acknowledge procedure. In carrying out this function, the allocator assigns bandwidth time slots per BLOCK SYNC period which have a fixed frequency.

A third primary function is to provide a stable, bounded access to the demand-based dedicated bandwidth block (with fairness to all nodes) and error control. This is accomplished through a dedicated slot per requester for high bandwidth users or through contention slots for high numbers of low bandwidth users.

The allocator, as the decision maker, partitions the network bus bandwidth and communicates its decisions to each of the nodes through packets dedicated for this purpose. These packets continually update the separate transmit opportunity table available to each node. Thus, a fourth primary allocator function is to broadcast the necessary information in the transmit map update packet to allow each node to maintain its transmit opportunity table.

The isochronous allocation, as discussed, is done on a request/acknowledge basis and is manually assignable. Moreover, if a node is not assigned either the isochronous or demand-based dedicated level of service, it is assigned the contention level, which is the default level. As such, the allocator's requirements are relatively straightforward with respect to providing isochronous and contention levels of service. The allocator, however, spends considerable time dynamically allocating bandwidth between the demand-based dedicated level of service and the contention level in light of the ever changing network conditions.

The dynamic allocation of bandwidth by the allocator allows the nodes on the network to request and obtain demand-based dedicated bandwidth for the transmission of their packets with no probability of collisions and the wasted bandwidth created by such collisions. The allocator allocates the demand-based dedicated bandwidth on an individual node basis with minimal latency and overhead in accessing the allocated bandwidth. The system nodes request demand-based dedicated bandwidth from the allocator which if allocated is only for the amount of bandwidth requested. The dynamic allocation of demand-based dedicated bandwidth compensates for the increased collision windows on longer networks, increased latencies for long networks, and increased traffic on the network bus.

Referring to FIG. 11–16, the dynamic allocation process by the allocator will be discussed. First, FIGS. 11 and 12 will be discussed to provide an overview of the allocation procedure and then FIGS. 13A and 13E will be discussed with regard an example of the allocation process. Next, FIG. 14 will be discussed which shows an example of the contents of the dedicated bandwidth request block, and then FIGS. 15 and 16 will be discussed regarding the fair allocation of bandwidth.

Figure 12:
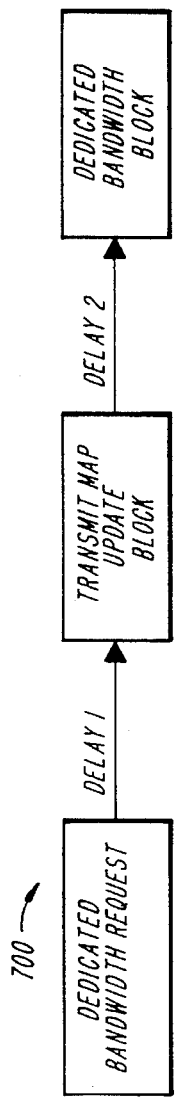
FIG. 12 is an example of the relationship between dynamic bandwidth allocation blocks.

Referring to FIG. 11 at 650 and FIG. 12 at 700, the three blocks of the transmit opportunity table that are important to the allocator in dynamically allocating the dedicated bandwidth are the dedicated bandwidth request block (DBRQB), the transmit map update block (TXMAPUB), and the dedicated bandwidth block (DBB). The relationship of these blocks is shown in FIG. 12.

The spacing between these blocks is based on the MAX_LOOP_DELAY through the network, as well as the processing time for the protocol. The first delay, Delay 1, is based on the network delay, PACER_LOOP_DELAY, in slots of the allocator and the additional overhead necessary for the allocator to process the transmit map update packets, as well as build up and queue the transmit map update packets. The second delay, Delay 2, is based on the maximum network delay, MAX_LOOP_DELAY, for the network topology and the additional overhead necessary for each node to process the transmit map update packets, as well as queue a data packet for transmission on the network bus.

The dedicated bandwidth request block is a block of slots reserved for requesting dedicated bandwidth and may be from 0–255 slots in length depending on the number of nodes active on the network bus and enabled for this function. Each node that has access to this block has a dedicated slot in which to transmit a dedicated bandwidth request. The dedicated bandwidth request block shown in FIG. 11 is divided into 32 byte slots. However, it is understood that the slot width may be increased or the number of slots may be increased and this still will be within the scope of the present invention. Each of the nodes that are properly enabled has access to one dedicated slot for requests.

The allocator maintains two tables that are used by the dedicated bandwidth request block. These are the assignment table and the slot table which are shown in FIG. 14 at 1000 and 1010, respectively. The assignment table contains the members of the dedicated bandwidth request block and preferably is 0–255 entries in length depending on the number of nodes having membership. Here, it also is understood that a greater number of slots may be unavailable and this still will be within the scope of the present invention. DBRQB_ASSIGN_# is the unique number assigned to each node. The allocator will point to the DBRQB_ASSIGN_#, actually the DBRQB_ASSIGN_#_HEAD, which will transmit first in the next dedicated bandwidth block.

The slot table contains the slots that make up the dedicated bandwidth request block. Preferably, this table will have 0–255 entries depending on the number of nodes having access to the block. Each node having membership has a dedicated slot into which it may transmit a dedicated bandwidth request packet. The slots are numbered 1–255. The assignment and slot tables are equal in length and unused entries in these tables are aged out. However, in order not to waste the bandwidth of the dedicated bandwidth request block, low bandwidth users preferably will transmit their demand-based dedicated bandwidth requests through the contention block.

The transmit map update block is a block of slots reserved for the allocator. The allocator uses this block to transmit map update packets. These packets fit into three 32 byte slots with the number transmitted within the block determined by the robustness level. Some of the important information contained in the packet are the granting of dedicated bandwidth, maintenance of the dedicated bandwidth request block including aging out of unused entries and providing fairness in bus access, error control to prevent unstable network operating conditions, granting membership in the dedicated bandwidth request block for nodes requesting it, and slot number boundaries between the block types.

The allocator processes the requests for dedicated bandwidth. The bandwidth requested by the nodes is in the number of time slots needed and can range from 64 to 8192 byte times per frame. These are converted into octets. Each node can be individually set for the maximum amount of bandwidth it can request, keeping in mind, however, the level of prioritization within the block. Request for access to a dedicated bandwidth block or being granted access to it does not preclude transmitting packets in the public contention block.

Figure 13A:
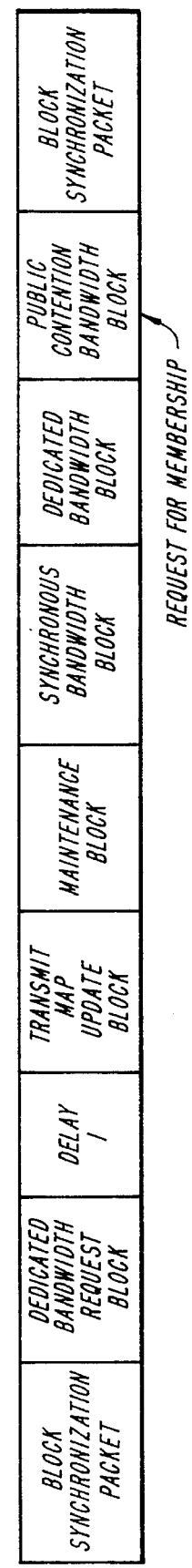

Referring to FIGS. 13A–13E, the procedure for requesting and obtaining dedicated bandwidth will be discussed. Membership in the dedicated bandwidth request block is obtained by sending a dedicated membership request packet in the public contention block as shown in FIG. 13A at 750 or in the maintenance channel if the public contention block is not available. In order for a node to do this, it must have been powered up, established block synchronization and its loop delay, and is enabled to request dedicated bandwidth.

The allocator grants the requesting node access to dedicated bandwidth by listening to all of the individual requests and setting aside bandwidth in the form of time slot counts in the dedicated bandwidth block. Preferably, the allocator does not grant bandwidth on an individual basis but on a bulk basis to all of the requesting nodes.

Figure 13B:
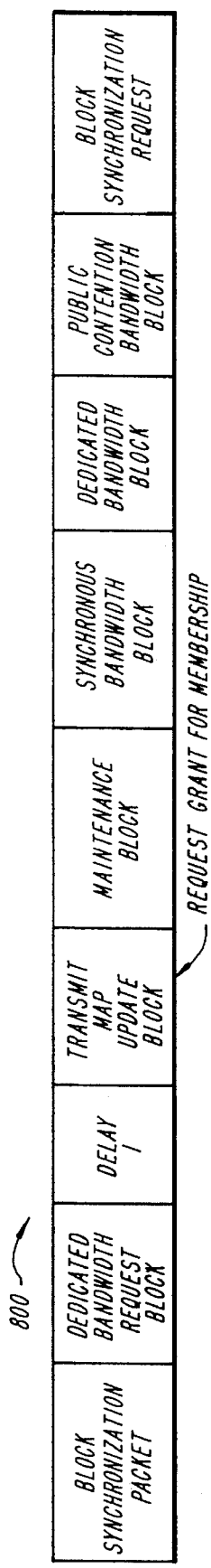

A grant of a request for membership in the dedicated bandwidth request block is transmitted to the requesting node through the transmit map update block, as shown in FIG. 13B at 800. At this point, the node has been assigned a dedicated slot for requesting bandwidth. To keep the slot the node must transmit in this slot regardless of whether it requires dedicated bandwidth or not. If the node does not use the slot, it is aged out and it will lose it.

Figure 13C:
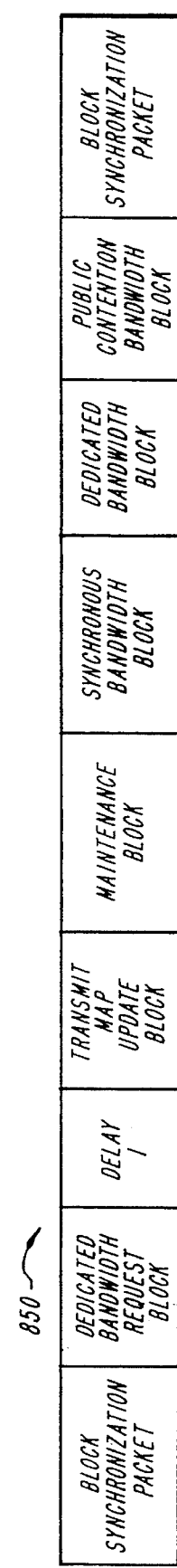

Referring to FIG. 13C, generally at 850, according to the allocation request process, each node queues the packets to be transmitted onto the network bus and requests dedicated bandwidth in time slot counts in its dedicated bandwidth request packet. The allocator receives the bandwidth request packets from each of the nodes requesting bandwidth in the dedicated bandwidth request block. Preferably, the allocator receives the request packets in a designated area of buffer memory. Each node computes the number of bandwidth requests and the amount of bandwidth requested, the total, as well as the amount upstream from it. Among other things, this determines the requests that are earlier and later than those of a node.

Figure 13D:
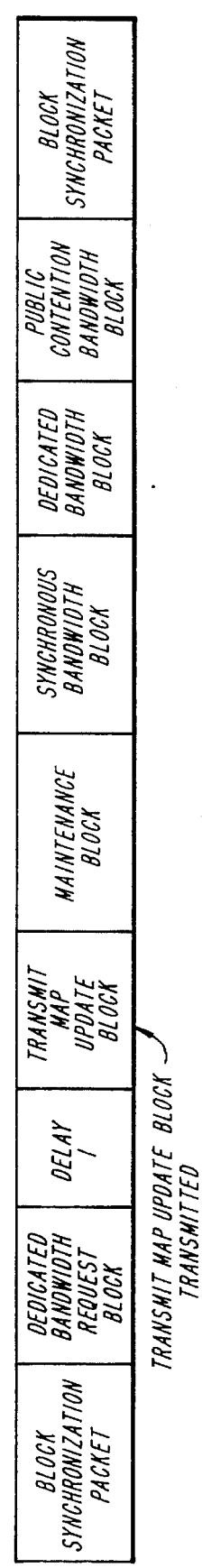

Referring to FIG. 13D at 900, the allocator transmits a transmit map update packet that includes the total number of bandwidth requests, the bandwidth requested, the bandwidth allocated, and additional fields where appropriate. Each node requesting bandwidth must verify its computed values for total bandwidth with that sent by the allocator in the transmit map update packet. It is only after positive verification that these values match that the node is enabled to transmit in the dedicated bandwidth block.

Each of the nodes that are enabled to transmit in the dedicated bandwidth block does so in the assigned time slots, deferring from the block boundary by the number of time slots requested and granted to its upstream neighbors. This is generally shown in FIG. 13E at 950. The requested bandwidth is only granted for the next dedicated bandwidth block and requests for additional dedicated bandwidth must be made through subsequent dedicated bandwidth request blocks.

Referring to FIG. 14 and Table III below, an example of request procedure will be explained referring to the assignment and slot tables:

TABLE III

| NODE ID | DBRQB ASSIGN # | DBRQB SLOT # | DEDICATED REQUEST | REQUESTED DEDICATED SLOT |
|---|---|---|---|---|
| D | 4 | 1 | y | 50 |
| E | 5 | 2 | y | 100 |
| F | 6 | 3 | n | 0 |
| A | 1 | 4 | y | 75 |
| B | 2 | 5 | n | 0 |
| C | 3 | 6 | n | 0 |

NODE_ID A is transmitting in DBRQB_SLOT_#_=4 and sees NODE_ID F, E, and D upstream with NODE_ID D and E requesting bandwidth and F not requesting any. NODE_IDA will recognize that the two frames, with a total of 150 slots, will be transmitted in the dedicated bandwidth block ahead of it, so it will defer transmission that number of slots. The allocator transmits the transmit map update packet that contains the total number of requests and the total bandwidth requested. The transmit map update packet delineates between isochronous and demand-based dedicated bandwidth. The nodes transmitting in the dedicated bandwidth block must agree with these values. A node may request dedicated bandwidth even if it is in a collision backoff state, thus allowing it to retransmit the collided packet in a dedicated environment.

The remainder of the fields of the transmit opportunity table shown in FIG. 11 are the block synchronization packet, the maintenance block, synchronous bandwidth block, and the public contention bandwidth block. The block synchronization packet, synchronous bandwidth, and public contention bandwidth blocks have been discussed previously. The remaining block, the maintenance block, is accessible by all nodes. It is used for determining the loop delay for the nodes, for the transmittal of a request to gain membership in the dedicated bandwidth request block when the public contention block is not available, and for setting up and breaking down virtual network circuits.

The allocator uses fairness in allocating the dedicated bandwidth block. As such, the ordering of the dedicated requests by the allocator is periodically changed to implement this fairness. More specifically, the allocator provides for round robin sequencing of the order of the transmittal requests in the dedicated bandwidth request block to achieve fairness. To further achieve fairness, the nodes that were unable to transmit due to the unavailability of dedicated bandwidth are given the highest priority in the next dedicated bandwidth request block. An example of how the allocator carries out fairness in dedicated bandwidth allocation will be described referring to FIGS. 15 and 16.

Figure 15:
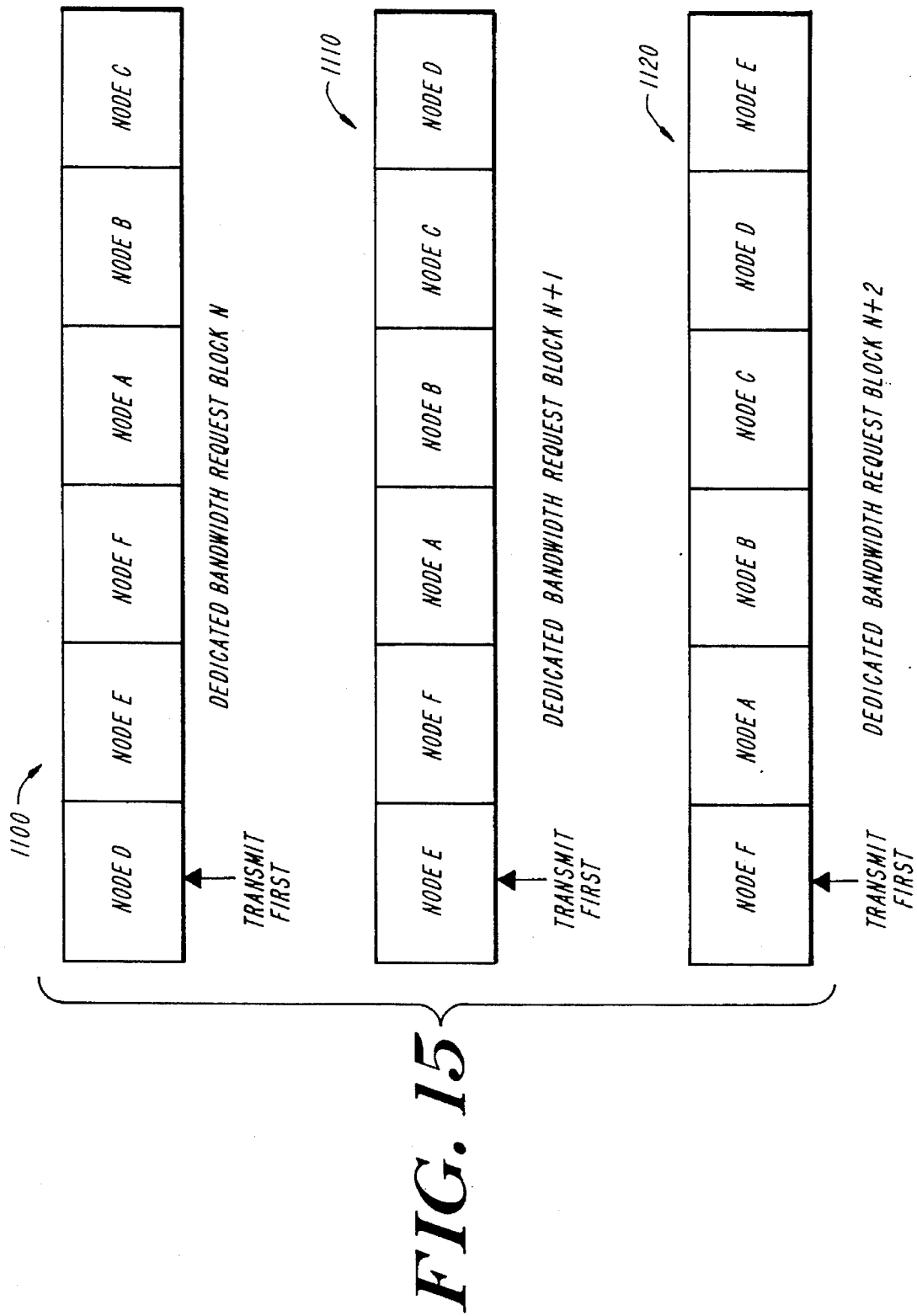
FIG. 15 is an example of the transmit order for request blocks N, N+1, and N+2 when all nodes are serviced.

FIG. 15 shows a dedicated bandwidth request block N at 1100, a dedicated bandwidth request block N+1 at 1110, and a dedicated bandwidth request block N+2 at 1120. Fairness in access latency is provided by moving the nodes up in order in the dedicated bandwidth request block as access is granted to the available bandwidth of subsequent dedicated bandwidth blocks.

Figure 16:
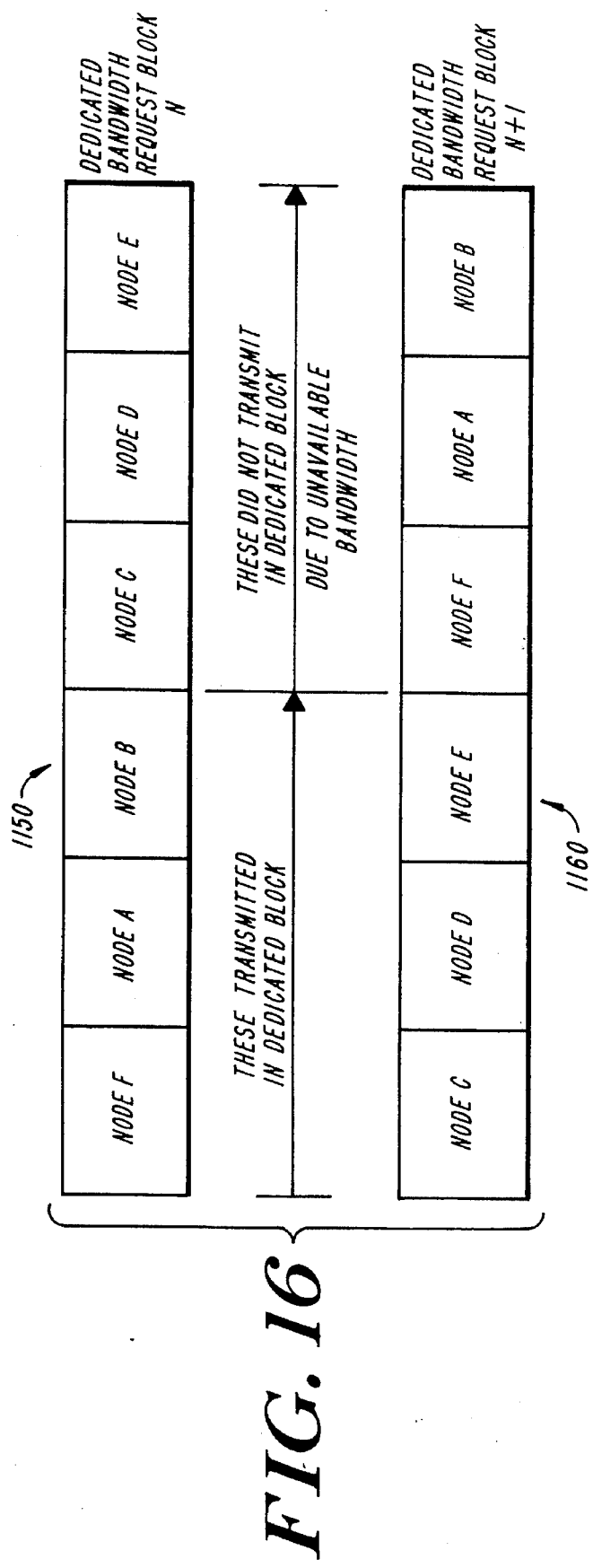
FIG. 16 is an example of the transmit order for request blocks N and N+1 when all nodes are not serviced.

FIG. 16 shows a dedicated bandwidth request block N at 1150 and a dedicated bandwidth request block N+1 at 1160. FIG. 16 illustrates how the allocator uses fairness when all of the requests for dedicated bandwidth cannot be met for a particular dedicated bandwidth block. This fairness is provided by moving nodes that were unable to gain bandwidth in the dedicated bandwidth block to the top of the order list for the next dedicated bandwidth request block. Thus, each node is guaranteed access to the network bus regardless of the traffic level.

The terms and expressions that are used herein are used as terms of expression and not of limitation. There is no intention in the use of such terms and expressions of excluding the equivalents of the features shown and described, or portions thereof, it being recognized that various modifications are possible in the scope of the present invention.

We claim:

1. A communications network for interactive communications among network users, comprising:
   a network bus;
   a plurality of system nodes connected to the network bus with each system node having a loop delay associated therewith;
   a pacer connected to the network bus for providing timing signals thereon for synchronizing network bus access operations by the plurality of system nodes;
   an allocator that is capable of substantially simultaneously allocating the plurality of system nodes access to a network bus bandwidth by a plurality of bus allocation methods according to a network bus protocol that is based on the network bus being segmented in a time domain into repeating periods, compensation by each system node of its loop delay before accessing the network bus to transmit data during a repeating period, dynamically allocating access to the network bus bandwidth according to the plurality of bus allocation methods, and timing signals from the pacer, with at least one of the bus allocation methods being based on system nodes accessing the network bus bandwidth according to this method being given a requested discrete portion of network bus bandwidth for a predetermined number of repeating periods for transmitting data on the network bus.

2. The communications network as recited in claim 1, wherein the network bus further includes buses of systems that connect to the system nodes.

3. The communications network as recited in claim 1, wherein the plurality of bus allocation methods includes isochronous, demand-based dedicated, and contention allocation methods.

4. The communications network as recited in claim 3, wherein the isochronous method of network bus bandwidth allocation is based on system nodes accessing discrete portions of the network bus bandwidth for a predetermined number of repeating periods for the transmission of data.

5. The communications network as recited in claim 3, wherein the allocator in response to requests from a plurality of the system nodes allocates to such system nodes access to the network bus bandwidth according to demand-based dedicated and contention allocation methods.

6. The communications network as recited in claim 5, wherein the allocator allocates system nodes access to discrete portions of the network bus bandwidth according to the demand-based dedicated allocation method for one repeating period.

7. A method for accessing a network bus bandwidth, comprising the steps of:

(A) generating timing signals on the network bus for synchronizing network bus access operations by a plurality of system nodes connected to the network bus;

(B) segmenting the network bus in a time domain into a plurality of repeating time periods;

(C) determining for each system node that system node's loop delay;

(D) each system node that seeks access to the network bus bandwidth according to a first network bus access method transmitting a request to an allocator for assignment of a discrete portion of the network bus bandwidth for a predetermined number of repeating periods in which the requesting system nodes may transmit data packets on the network;

(E) the allocator assigning the system nodes that requested assignment of a discrete portion of the network bandwidth at step (D) a discrete portion of the network bus bandwidth for a predetermined number of repeating periods until a total amount of network bus bandwidth assigned by the allocator equals a predetermined maximum bandwidth, and for any system nodes that the allocator rejects its request for access according to this first network bus access method because the predetermined maximum bandwidth is reached, then step (G);

(F) the system nodes assigned discrete portions of network bus bandwidth at step (E) transmitting data packets onto the network bus at a time up to an amount assigned by the allocator, with each of such system nodes commencing transmission of the data packets one loop delay before a time the allocator assigned for that system node for transmitting data packets on the network bus;

(G) continuously monitoring an amount of data packets on the network bus and a number of collisions of data packets on the network bus;

(H) allowing any of the plurality of system nodes to transmit at least one data packet on the network bus by a second network bus access method, with each of such system nodes using the second network bus access method commencing transmission of the at least one data packet one loop delay before a time block the allocator has assigned for such system nodes to transmit on the network bus and at least one deferral condition is met;

(I) the allocator accepting requests from any of the plurality of system nodes for discrete portions of a next repeating period to transmit at least one data packet on the network bus according to a third network bus access method; and (J) the allocator assigning a discrete portion of the network bus bandwidth of the next repeating period to each up to a predetermined number of the system nodes requesting access at step (I) to the network bus according to the third network bus access method, with each of such system nodes accessing this network bus according to the third network bus access method commencing transmission of the at least one data packet one loop delay before a time the allocator has assigned for each system node to transmit on the network bus.

8. The method as recited in claim 7, wherein step (A)

globally synchronizes operations on the network bus.

9. The method as recited in claim 7, wherein step (C) includes the following substeps:

(1) a system node transmitting at least one data packet to itself on the network bus;

(2) starting a timing means upon a start of the transmission at substep (1) of step (C);

(3) receiving back at the system node the data packet transmitted at substep (1) of step (C);

(4) stopping the timing means upon receiving back the data packet at substep (3) of step (C) and calculating the loop delay based on the start and stop times; and (5) storing at the system node the loop delay calculated at substep (4) of step (C).

10. The method as recited in claim 7, wherein the allocator is capable of substantially simultaneously assigning the first, second, and third network bus access methods to the plurality of system nodes.

11. The method as recited in claim 7, wherein steps (H), (I), and (J) result in a dynamic assignment of network bus bandwidth according to the second and third network bus access methods based on a load of each of the nodes on the network bus.

12. The method as recited in claim 11, wherein a number of system nodes requesting access to the network bus bandwidth according to the third network bus access method increases as a number of collisions of data packets on the network bus increases.

13. The method as recited in claim 11, wherein a number of system nodes requesting access to the network bus bandwidth according to the third network bus access method increases as the number of data packets on the network bus increases.

14. The method as recited in claim 12, wherein the allocator in assigning a portion of the network bus bandwidth to the system nodes requesting access to the network bus bandwidth according to the third network bus access method will assign a discrete portion of the network bus bandwidth to each requesting system node until a total amount of network bus bandwidth assigned is equal to a predetermined maximum bandwidth and queuing any requests for access to the network bus bandwidth according to the third network bus access method that were rejected because the predetermined maximum bandwidth was reached.

15. The method as recited in claim 14, wherein the queued requests have priority in an assignment of discrete portions of the network bus bandwidth in subsequent repeating periods for access to the network bus according to the third network bus access method.

16. The method as recited in claim 7, wherein transmitting data packets onto the network bus according to the first, second, and third network bus access methods includes transmitting a data frame, with the data frame having a plurality of data packets, the data frame having less at least network bus bandwidth overhead than if the plurality of data packets making up the data frame are transmitted separately.

17. The method as recited in claim 16, wherein transmitting the data frame onto the network bus according to the second network bus access method includes transmitting a first data packet of the data frame according to the second network bus access method and a remainder of the data packets that follow the first data packet according to a dedicated bus access method.

18. A method for accessing a network bus bandwidth, comprising the steps of:

(A) generating timing signals on the network bus for synchronizing network bus access operations by a plurality of system nodes connected to the network bus;

(B) determining for each system node that system node's loop delay;

(C) segmenting the network bus in the time domain into repeating periods of predetermined length and dividing each of the repeating periods into a plurality of time slots, with each repeating period including a predetermined number of time slots for transmission of a timing signal generated at step (A), a predetermined number of time slots for system nodes to transmit data packets on the network bus based on the system nodes accessing the network bus according to a first network bus access method, a predetermined number of time slots for system nodes to transmit data packets on the network bus based on the system nodes accessing the network bus according to a second network bus access method, and a predetermined number of time slots for system nodes to transmit data packets on the network bus based on the system nodes accessing the network bus according to a third network bus access method;

(D) each system node seeking access to the network bus bandwidth according to the first network bus access method transmitting a request to an allocator for assignment of a discrete portion of the network bus bandwidth defined by the predetermined time slots set forth in step (C) for system nodes to access the network bus according to the first network bus access method;

(E) the allocator assigning each of the system nodes requesting a portion of the network bus bandwidth at step (D) a discrete portion of the network bus bandwidth until a total amount of network bus bandwidth assigned by the allocator equals the predetermined number of time slots set forth in step (C) for system nodes to access the network bus according to the first network bus access method, and for any system nodes that the allocator rejects its request for a discrete portion of the network bus bandwidth requested at step (D), then step (G);

(F) the system nodes assigned network bus bandwidth at step (E) transmitting data packets onto the network bus at a time up to an amount assigned by the allocator, with each of the system nodes commencing transmission of the data packets one loop delay before the time the allocator assigned for each system node to transmit on the network bus;

(G) continuously monitoring an amount of data packets on the network bus and a number of collisions of data packets on the network bus;

(H) allowing any of the plurality of system nodes to transmit at least one data packet on the network bus by the second network bus access method in the predetermined number of time slots set forth in step (C) for system nodes accessing the network bus according to the second network bus access method, with each of the system nodes using the second network bus access method commencing transmission of the at least one data packet one loop delay before the predetermined number of time slots set forth at step (C) for system nodes accessing the network bus according to the second network bus access method and at least one deferral condition is met;

(I) the allocator accepting requests from any of the plurality of system nodes for discrete portions of a next repeating period of the predetermined number of time slots set forth in step (C) for system nodes accessing the network bus according to the third network bus access method; and (J) the allocator assigning discrete portions of the next repeating period of the predetermined number of time slots set forth in step (C) for system nodes accessing the network bus according to the third network bus access method according to the requests at step (I), with each of such system nodes using the third network bus access method commencing transmission of at least one data packet one loop delay before a time the allocator has assigned for such system nodes to transmit data packets onto the network bus.

19. The method as recited in claim 18, wherein step (A) globally synchronizes operations on the network bus.

20. The method as recited in claim 18, wherein step (B) includes the following substeps:

(1) a system node transmitting at least one data packet to itself on the network bus;

(2) starting a timing means at a start of the transmission at substep (1) of step (B);

(3) receiving back at the system node the data packet transmitted at substep (1) of step (B);

(4) stopping the timing means upon receiving back the data packet at substep (3) of step (B) and calculating the loop delay based on the start and stop times; and (5) storing at the system node the loop delay calculated at substep (4) of step (B).

21. The method as recited in claim 18, wherein the allocator is capable of substantially simultaneously assigning the first, second, and third network bus access methods to the plurality of system nodes.

22. The method as recited in claim 18, wherein steps (H), (I), and (J) result in a dynamic assignment of network bus bandwidth according to the second and third network bus access methods based on a load of each of the nodes on the network bus.

23. The method as recited in claim 22, wherein a number of system nodes requesting access to the network bus bandwidth according to the third network bus access method increases as a number of collisions of data packets on the network bus increases.

24. The method as recited in claim 22, wherein a number of system nodes requesting access to the network bus bandwidth according to the third network bus access method increases as a number of data packets on the network bus increases.

25. The method as recited in claim 23, wherein at step (J) the allocator assigns each of the system nodes requesting a portion of the network bus bandwidth a discrete portion of the network bus bandwidth until a total amount of the network bus bandwidth assigned equals the predetermined number of time slots set forth in step (C) for system nodes accessing the network bus according to the third network bus access method, and queuing the requests for discrete portions of the network bus bandwidth that were rejected because the total predetermined number of time slots set forth in step (C) has been reached for system nodes accessing the network bus according to the third access method.

26. The method as recited in claim 25, wherein the allocator assigns for the requests in the queue a discrete number of time slots of subsequent repeating periods having a predetermined number of time slots as set forth in step (C) for system nodes accessing the network bus according to the third network bus access method.

27. The method as recited in claim 25, wherein for subsequent repeating periods the requests in the queue are given priority for the assignment of the predetermined number of time slots set forth in step (C) for system nodes accessing the network bus according to the third network bus access method.

28. The method as recited in claim 18, wherein transmitting data packets onto the network bus according to the first, second, and third network bus access methods includes transmitting a data frame, with the data frame having a plurality of data packets, the data frame having less at least network bus bandwidth overhead than if the plurality of data packets making up the data frame are transmitted separately.

29. The method as recited in claim 28, wherein transmitting the data frame onto the network bus according to the second network bus access method includes transmitting a first data packet of the data frame according to the second network bus bandwidth access method and a remainder of the data packets that follow the first data packet according to the a dedicated bus access method.

30. The method as recited in claim 7, wherein the method further includes increasing a probability of collision detection by ensuring that collisions for a particular data packet occur before a predetermined time after a start of transmission of that data packet.

31. The method as recited in claim 18, wherein the method further includes increasing a probability of collision detection by ensuring that collisions for a particular data packet occur before a predetermined time after a start of transmission of that data packet.

32. The method as recited in claim 7, wherein each data packet to be transmitted includes at least one field for permitting additional information to be carried by that data packet.

33. The method as recited in claim 18, wherein each data packet to be transmitted includes at least one field for permitting additional information to be carried by that data packet.

34. The method as recited in claim 7, wherein each system node is capable of transmitting data packets onto the network bus according to the second network bus access method when a remaining length of a data frame presently on the network bus is less than that system node's loop delay.

35. The method as recited in claim 18, wherein each system node is capable of transmitting data packets onto the network bus according to the second network bus access method when a remaining length of a data frame presently on the network bus is less than that system node's loop delay.

36. The method as recited in claim 7, wherein each system node includes a means that the allocator accesses to provide transmit information for that system node on a per time slot basis.

37. The method as recited in claim 36, wherein the means that the allocator accesses includes a transmit opportunity table.

38. The method as recited in claim 18, wherein each system node includes a means that the allocator accesses to provide transmit information for that system node on a per time slot basis.

39. The method as recited in claim 38, wherein the means that the allocator accesses includes a transmit opportunity table.

40. The method as recited in claim 16, wherein each data packet of the data frame has its own source address and destination address.

41. The method as recited in claim 28, wherein each data packet of the data frame has its own source address and destination address.

42. The communications network as recited in claim 1, wherein one of the plurality of system nodes is the pacer.

43. The communications network as recited in claim 42, wherein the pacer further includes the allocator.

44. The communications network as recited in claim 3, wherein the allocator in response to requests from a plurality of the system nodes allocates to such system nodes access to the network bus bandwidth according to demand-based dedicated and contention allocation methods based on an amount of data being transmitted on the network bus.

45. The communications network as recited in claim 3, wherein the allocator in response to requests from a plurality of the system nodes allocates to such system nodes access to the network bus bandwidth according to demand-based dedicated and contention allocation methods based on a number of collisions of data occurring on the network bus.

46. A method for allocating access to a network bus of a communications network having a plurality of system nodes, comprising the steps of:

segmenting a network bus bandwidth in a time domain into repeating periods;

partitioning each of the repeating periods of the network bus bandwidth into a predetermined amount of network bus bandwidth for each of a plurality of bus allocation methods;

dynamically allocating access by the system nodes to the network bus bandwidth according to the plurality of bus allocation methods, with the allocation of access by the system nodes to the network bus bandwidth according to a first bus allocation method including the steps of, accepting requests from each system node seeking access to the network bus bandwidth according to the first bus allocation method for discrete portions of the network bus bandwidth, and assigning to each of the system nodes that requested access to the network bus bandwidth according to the first bus allocation method a discrete portion of the network bus bandwidth until a total amount of the network bus bandwidth assigned equals the predetermined amount of network bus bandwidth partitioned for the first allocation method; and transmitting a transmit map update packet to the plurality of system nodes to control access to the network bus by the plurality of system nodes.

47. The method as recited in claim 46, wherein the first bus allocation method is an isochronous allocation method.

48. The method as recited in claim 46, wherein allocating access by the system nodes to the network bus bandwidth according to a second bus allocation method comprises:

monitoring an amount of data packets on the network bus and a number of collisions of data packets on the network bus; and allowing any of the plurality of system nodes to transmit at least one data packet on the network bus by a second bus allocation method as long as at least one deferral condition is met.

49. The method as recited in claim 48, wherein the second bus allocation method is a contention allocation method.

50. The method as recited in claim 48, wherein allocating access by the system nodes to the network bus bandwidth according to a third bus allocation method comprises:

accepting requests from any of the plurality of system nodes for discrete portions of a next repeating period of the network bus bandwidth;

assigning discrete portions of the next repeating period of the network bus bandwidth according to the requests for such portions, until a total amount of the network bus bandwidth assigned equals an amount of the network bus bandwidth available; and queuing any of the requests that were not assigned discrete portions of the next repeating period of the network bus bandwidth.

51. The method as recited in claim 50, wherein the third bus allocation method is a demand-based dedicated allocation method.

52. The method as recited in claim 50, further comprising, for subsequent repeating periods, giving priority for the assignment of the predetermined amount of network bus bandwidth partitioned for the third of the bus allocation methods to the queued requests.

53. A method for accessing a network bus bandwidth, comprising the steps of:

segmenting the network bus in a time domain into a plurality of repeating periods and dividing each of the repeating periods into a plurality of time slots;

allocating a first predetermined number of the plurality of time slots for use by system nodes to transmit data packets on the network bus according to a first network bus allocation method if requested;

allocating a remainder of the plurality of time slots for use by system nodes to transmit data packets on the network bus according to a second network bus allocation method;

assigning discrete portions of the first predetermined number of the plurality of time slots for system nodes to transmit data packets on the network bus according to the first network bus allocation method according to a dedicated bandwidth allocation method; and permitting system nodes to transmit data packets on the network bus according to the second network bus allocation method according to a contention allocation method.

54. A method for accessing a network bus bandwidth, comprising the steps of:

generating timing signals on the network bus for synchronizing network bus access operations by a plurality of system nodes connected to the network bus;

segmenting the network bus in a time domain into a plurality of repeating time periods and dividing each of the repeating time periods into a plurality of time slots;

allocating a first predetermined number of the plurality of time slots for use by system nodes to transmit data packets on the network bus according to a first network bus allocation method if requested;

allocating a remainder of the plurality of time slots for use by system nodes to transmit data packets on the network bus according to a second network bus allocation method after allocating time slots for the first and a third network bus allocation methods;

allocating a third predetermined number of the plurality of time slots for use by system nodes to transmit data packets on the network bus according to the third network bus allocation method if requested;

assigning discrete portions of the first predetermined number of the plurality of time slots for system nodes requesting access to the network bus to transmit data packets according to the first network bus allocation method;

permitting system nodes to transmit data packets on the network bus according to the second network bus allocation method; and assigning discrete portions of the third predetermined number of the plurality of time slots of the next repeating period for system nodes requesting access to the network bus according to the third network bus allocation method.

55. The method as recited in claim 54, wherein the first network bus allocation method is an isochronous allocation method, the second network bus allocation method is a contention allocation method, and the third network bus allocation method is a demand-based dedicated allocation method.

* * * * *